United States Patent [19]
Hughes

[11] Patent Number: 5,167,353
[45] Date of Patent: Dec. 1, 1992

[54] "U" POST BRACKET FOR BICYCLES

[76] Inventor: Jack I. Hughes, 203 Canyon Way, Arroyo Grande, Calif. 93420

[21] Appl. No.: 499,788

[22] Filed: Mar. 27, 1990

[51] Int. Cl.$^5$ ............................................. B62J 11/00
[52] U.S. Cl. ................................... 224/39; 224/30 R; 248/229; 248/316.1; 248/316.7
[58] Field of Search ................ 224/30 R, 30 A, 32 R, 224/34–41, 42, 45; 248/316.1, 316.7, 309.1, 229, 229 A, 230, 231, 231.8, 218.4, 219.1, 219.4

[56] References Cited

U.S. PATENT DOCUMENTS

| | | | |
|---|---|---|---|
| 229,670 | 8/1880 | Carrick | 248/229 A X |
| 392,588 | 11/1888 | Cone | 248/230 |
| 449,460 | 3/1891 | Bannister | 224/37 |
| 501,392 | 7/1893 | Wiedenmann | 248/229 X |
| 1,807,501 | 5/1931 | Alexander | 224/39 R |
| 3,228,640 | 1/1966 | Wolsh | 248/229 |
| 3,269,683 | 8/1966 | Shinaver | 248/230 |
| 3,452,955 | 7/1969 | Hartwig | 248/229 |
| 3,747,166 | 7/1973 | Eross | 248/229 |
| 3,967,475 | 7/1976 | Zane | 224/39 X |
| 4,121,798 | 10/1978 | Schumacher et al. | 248/229 X |
| 4,345,704 | 8/1982 | Boughton | 224/39 |
| 4,436,232 | 3/1984 | Zane et al. | 224/39 |
| 4,828,151 | 5/1989 | Goss | 224/30 A |
| 4,966,382 | 10/1990 | Giles | 224/30 R X |
| 5,000,210 | 3/1991 | Worthington, Jr. | 248/231.8 |

FOREIGN PATENT DOCUMENTS

| | | | |
|---|---|---|---|
| 0056542 | 7/1982 | European Pat. Off. | 224/30 R |
| 0666693 | 4/1936 | Fed. Rep. of Germany | 224/30 R |
| 2927762 | 1/1981 | Fed. Rep. of Germany | 224/30 R |
| 0470354 | 9/1914 | France | 224/39 |
| 8500659 | 10/1986 | Netherlands | 224/30 A |
| 0024785 | of 1897 | United Kingdom | 224/30 R |
| 0021051 | of 1906 | United Kingdom | 248/230 |
| 0024828 | of 1907 | United Kingdom | 224/36 |
| 0025155 | of 1907 | United Kingdom | 248/230 |
| 0104044 | 2/1917 | United Kingdom | 224/35 |
| 0207291 | 11/1923 | United Kingdom | 224/30 R |

Primary Examiner—Henry J. Recla
Assistant Examiner—Casey Jacyna
Attorney, Agent, or Firm—John P. Halvonik

[57] ABSTRACT

The invention relates to a bracket for holding U shaped locks onto the seat posts of bicycles in a space efficient manner. One end of the bracket uses a circular shaped post attaching means which can be tightened around differently sized seat by means of a screw. The other end has a channel with a C-shaped cross section which is deformable and can be made to fit around a portion of the U lock. The shape of the channel is at right angles to shape of the seat post attaching means and thus the U lock can be neatly positioned under the seat of a bicycle.

2 Claims, 2 Drawing Sheets

"U" POST BRACKET FOR BICYCLES

BACKGROUND OF THE INVENTION

1. Field of the Invention

The invention relates to the type of security devices commonly used with a bicycle or bicycle related locking devices. The purpose of the invention is to carry these "U" type locks in a position on the bike that saves the space under the seat for other accessories as well as keep the "U" type lock secure on the bicycle. In particular, this invention is a molded plastic bracket type device that expands around the seat post of a bicycle to provide an attachment point for "U" type locks etc.

2. Description of the Prior Art

Current brackets of similar usage attach to the area located within the main frame of the bicycle, an area that can be better served by the attachment of other bicycle accessories used to carry the cyclist's personal items. The bracket of the present invention is designed to allow these other accessories to be carried on the bicycle in the main frame area and still carry a "U" lock, placing the U lock in a location that is relatively more functional as well as equally secure.

SUMMARY OF THE INVENTION

The invention is a flexible device, manufactured of a material with the ability to expand or contract to allow it to be attached to the bicycle seat post thus enabling the cyclist to clip a "U" type lock into the bracket. This bracket allows the lock to be secured by placing it through the area of a bicycle behind the seat tube and under the seat stays. The U Post Bracket has been designed to utilize a location on a bicycle that is not needed by other accessories that are commonly used on today's bicycles so that these accessories can also be carried on the bike.

It is an objective of this invention to provide an alternative attachment point for a "U" lock bracket, allowing the cyclist to place bicycling accessories such as a water bottle, tire air pump or nylon bags under, around or within the mainframe of the bike.

Another objective of the invention is to provide a more secure and functional location on which to attach the "U" lock itself.

Other advantages of the invention will be apparent to one skilled in the art.

DESCRIPTIONS OF THE DRAWINGS

FIG. 1 shows a line drawing of the preferred shape of the bracket.

FIG. 2 shows a mechanical elevation, side view. The fixing bolt and lock channel are the key displayed parts FIG. 3 shows a mechanical elevation, top view. The seat post ring, expansion ring and bridge are the key displayed parts.

FIG. 4 shows the bracket and lock, showing how the lock will be placed in the area of the bike known as the seat stay/seat mast area.

DESCRIPTION OF THE PREFERRED EMBODIMENT

Figure 4:
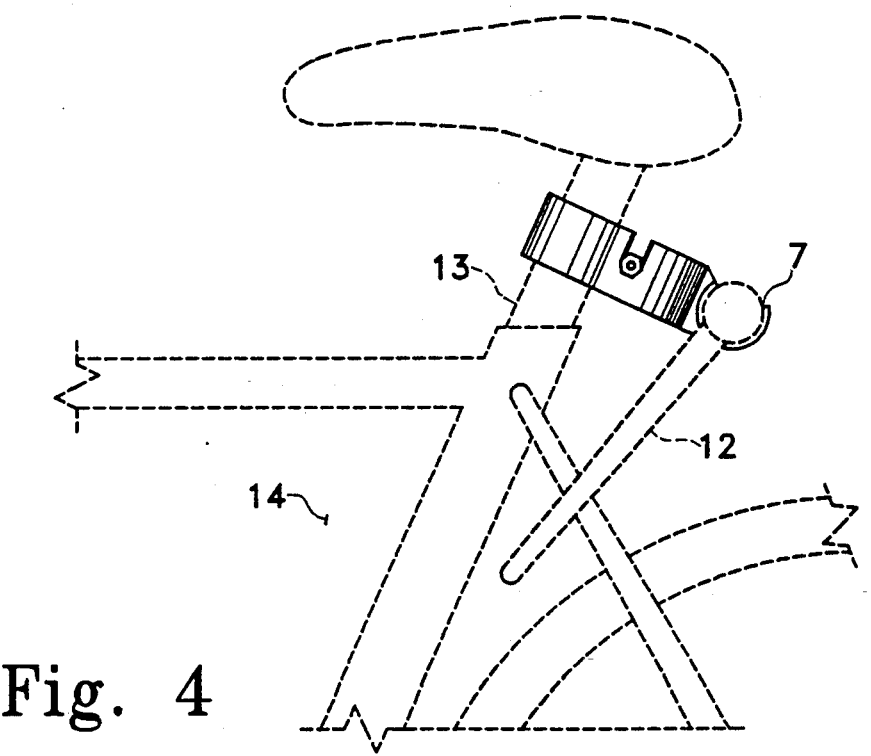

The U Post is designed to carry a bicycle lock of the generic designation, "U lock." (12 in FIG. 4) This device is used to transport the locking device from one location to another. The channel opening 7 of the U Post Bracket that supports the lock is designed to be parallel to the ground so that it can suspend the lock's "U" shape downward. The device is preferably of a single piece.

Figure 1:
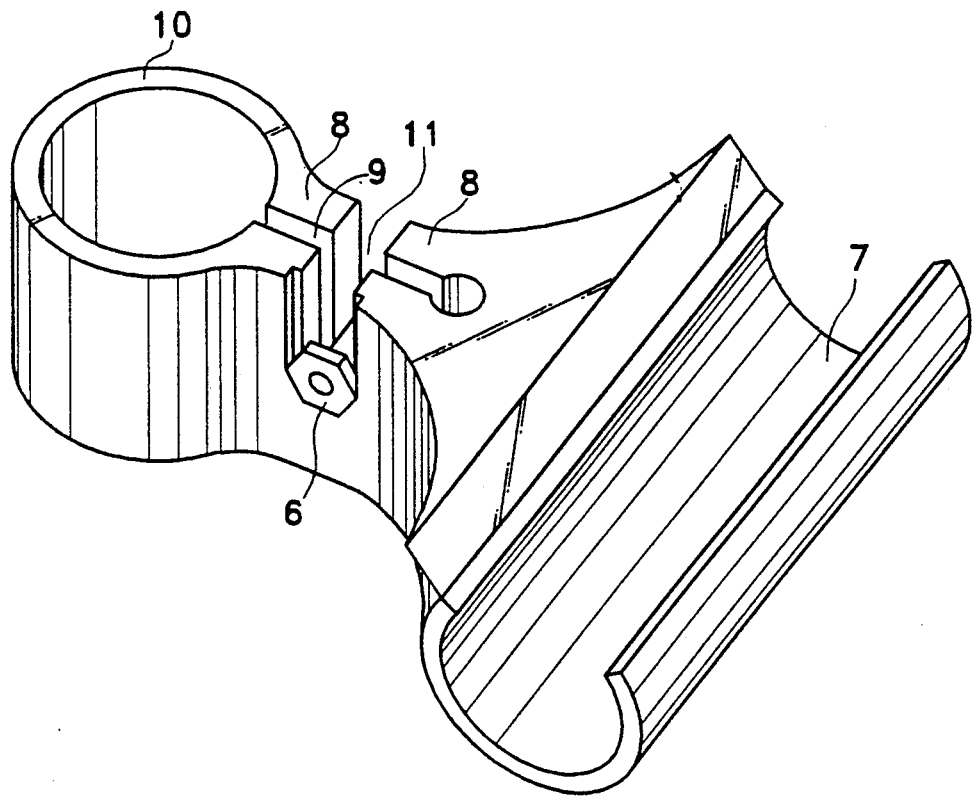
Figure 2:
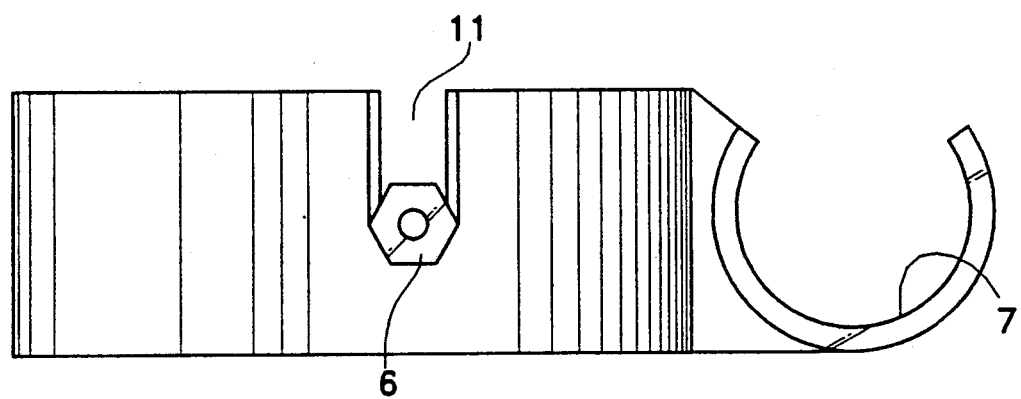
Figure 3:
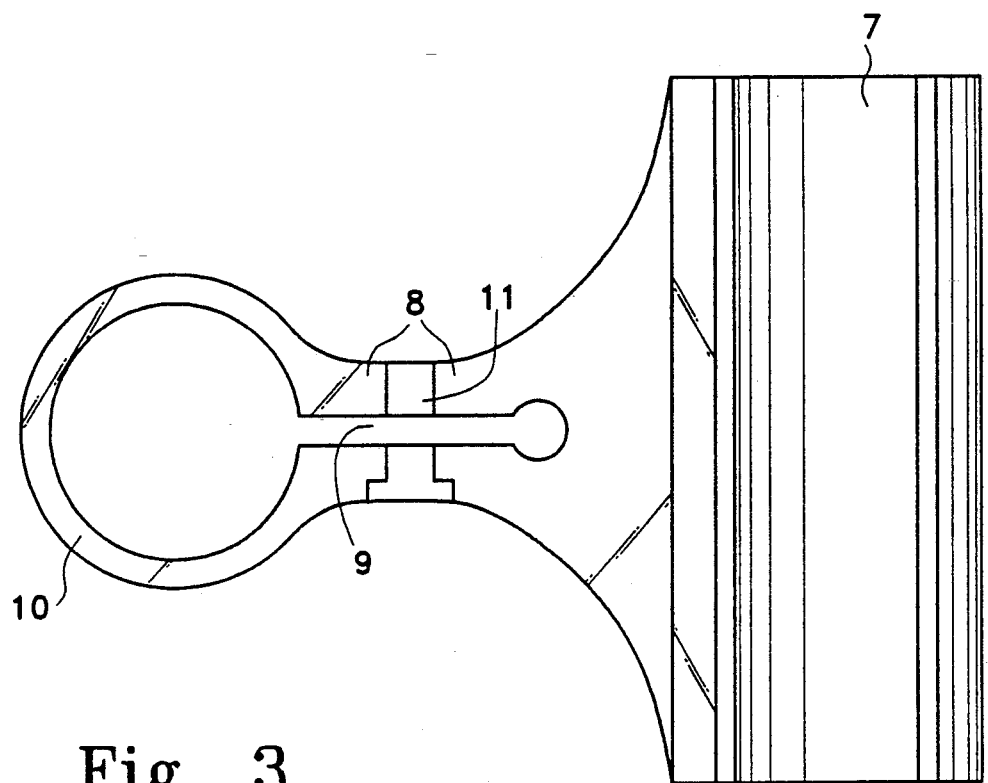

The device comprises a plastic molded device known as the U Post, see FIG. 1. It has a lock channel at one end FIG. 2 part 7, that is cylindrical in shape with a channel that runs the length of the cylinder. The channel enables the user to slide the main locking member of a "U" type of lock into it. "U" type locks are what the U Post is preferably used with. The channel is preferably about 27 mm by 73 mm. The lock channel is connected by a bridge 8 (FIG. 3), with an expansion slot, 9, to a ring, 10. This ring has a preferred inside diameter of about 26 mm. which allows a bicycle seat post 13 to fit into, see FIG. 4. The expansion groove in the bridge allows the ring to expand or contract as needed around the common sized seat posts in use. It is slid over the seat post to place the U Post in a position where it can be used to hold a "U" type of lock on the bike. The center line of the diameter of the ring is in a 90 degree relation to the center line of the diameter of the lock channel. This is so that the channel will be in an upward position when the ring is secured onto the seat post and thus able to hold the U lock, see FIG. 4. A nut bolt combination 6 located within the bridge (FIG. 2) is used to control expansion groove width and ring tightness around the seat post. As seen in FIG. 3, there are two slots 11 in the bridge, perpendicular to the expansion groove, which can accomodate this nut and bolt combination.

It is preferred that the device be injection molded of plastic but any method of making a plastic piece will do. Alternate materials than plastic are possible since the only requirement of the material is that it be somewhat resilient and sturdy enough to last in use on a bike.

The preferred overall size of the device is 100 mm by 72 mm, with an (approx.) 26.6 mm ring at one end and a channel of about 33 mm. rotated 90 degrees at the other end. This device is designed for flexibility to expand or contract to fit onto most commonly sized bicycle seat posts (pillars) currently being manufactured.

A "U" type lock is a type of security device currently being manufactured in today's market. Its shape of a "U" gives it its name. The uncommon part of the description is that the "U" shape is capped off by a bar or main locking member. This main member allows the two towers or upward parts of the "U" to enter. This can be by sliding, hooking, or hinging. The "U" now has a top. This top contains the actual locking device used to secure the lock unit in a closed position.

To attach the U Post, the seat or the seat post is removed from the bicycle, at which time the U Post is slid or placed around the exposed end of the seat post. The seat or seat post is then reinstalled. The U Post Bracket is then slid up or down the seat post to the desired height with which the "U" lock will be installed. With the U post in place a U lock is placed around the seat stays at the seat/seat mast area, FIG. 4. Since the main locking member must be removed to do this, the reattachment of the member will secure the lock to the bicycle.

The main locking member of the U lock is then placed into the channel by hand. The actual "U" shape of the lock serves to secure itself by placement under the area of the bicycle behind the seat tube and under the seat stays while being suspended from the U Post Bracket on the seat post. The bracket can then be slid up or down the seat post to accommodate the different lengths of the "U" locks.

The bracket is designed hold the U lock without any movement. The U lock is an accessory that is popular but does interfere with other, traditional accessories. By the use of the U post bracket the areas 14 that would have been taken up by a conventional bracket are now available for use.

I claim:

1. A lock attaching apparatus made of deformable material for securing the U bolt portion of a lock to the seat post of a bicycle said apparatus comprising:

said apparatus being of one-piece construction and having a seat post attaching portion at one end of said apparatus, and a lock attaching portion at the opposite end of said apparatus, and an intermediate portion connecting said portions to one another, said seat post attaching portion comprising a circular-shaped post enclosing portion, said lock attaching portion comprising a channel having a C-shaped cross section for conforming around said U bolt portion, the plane of said circular-shaped post encircling portion being perpendicular to the C-shaped cross section of said channel so that said channel faces upward when said seat post attaching portion is attached to said seat post, said intermediate portion having an expansion groove, said groove dividing said intermediate portion into two parallel portions which connect said post attaching portion and said lock attaching portion, said parallel portions having slots perpendicular to said expansion groove for allowing a nut and bolt combination placed in said slots to tighten said post attaching portion around said seat post.

2. The apparatus of claim 1 wherein said deformable material is plastic.

* * * * *